United States Patent
Li

(10) Patent No.: US 7,292,543 B2
(45) Date of Patent: *Nov. 6, 2007

(54) SPEAKER TRACKING ON A MULTI-CORE IN A PACKET BASED CONFERENCING SYSTEM

(75) Inventor: Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1165 days.

This patent is subject to a terminal disclaimer.

(21) Appl. No.: 10/315,188

(22) Filed: Dec. 10, 2002

(65) Prior Publication Data

US 2003/0198195 A1   Oct. 23, 2003

Related U.S. Application Data

(63) Continuation-in-part of application No. 10/123,310, filed on Apr. 17, 2002, now Pat. No. 7,145,884, and a continuation-in-part of application No. 10/123,483, filed on Apr. 17, 2002, now Pat. No. 7,020,257.

(51) Int. Cl.
    *H04Q 11/00*   (2006.01)
(52) U.S. Cl. .................. 370/260; 370/263; 379/201.01; 379/202.01
(58) Field of Classification Search ........ 370/260–269; 379/93.22, 201.01, 202.01, 203.01, 204.01, 379/205.01
    See application file for complete search history.

(56) References Cited

U.S. PATENT DOCUMENTS

| | | | | |
|---|---|---|---|---|
| 4,126,766 A | * | 11/1978 | McLaughlin et al. | ....... 370/261 |
| 5,511,112 A | * | 4/1996 | Szlam | .............. 379/266.06 |
| 5,724,416 A | * | 3/1998 | Foladare et al. | ........ 379/202.01 |
| 6,415,253 B1 | * | 7/2002 | Johnson | ................ 704/210 |
| 6,956,828 B2 | * | 10/2005 | Simard et al. | ............... 370/260 |
| 7,020,257 B2 | * | 3/2006 | Li | ........................ 379/202.01 |
| 2006/0062368 A1 | * | 3/2006 | Saha et al. | ............. 379/202.01 |

* cited by examiner

*Primary Examiner*—Binh K. Tieu
(74) *Attorney, Agent, or Firm*—Steven A. Shaw; W. James Brady; Frederick J. Telecky, Jr.

(57) ABSTRACT

A distributed intelligence conferencing system having a plurality of conferencing nodes to connect groups of participants to a conference. Each of the conferencing nodes provides for the connection of one or more participants to the conference. Each node includes a DSP for distributed signal processing. The nodes DSP includes: A signal measuring device for measuring features of the signals from each of the participants. A single core speaker tracking algorithm identifies the active speaker on a local node based upon the relative signal features of each of the number of participant input signals. A communication device communicates the measured signal features for the active local participant input signals only to all other conferencing nodes. A multi core speaker tracking algorithm compares the features of the signals from the speakers on the local node with the features of the signals from the speakers on other nodes. A final determination is made to identify the active speakers for the entire conference so that only the signals from a limited number of speakers transmitted across the system bus.

16 Claims, 17 Drawing Sheets

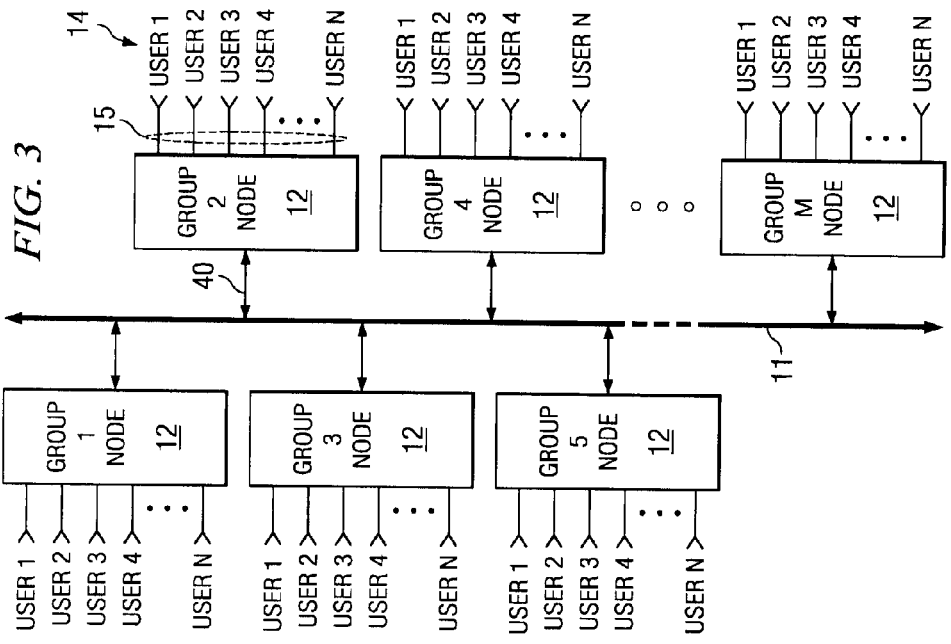
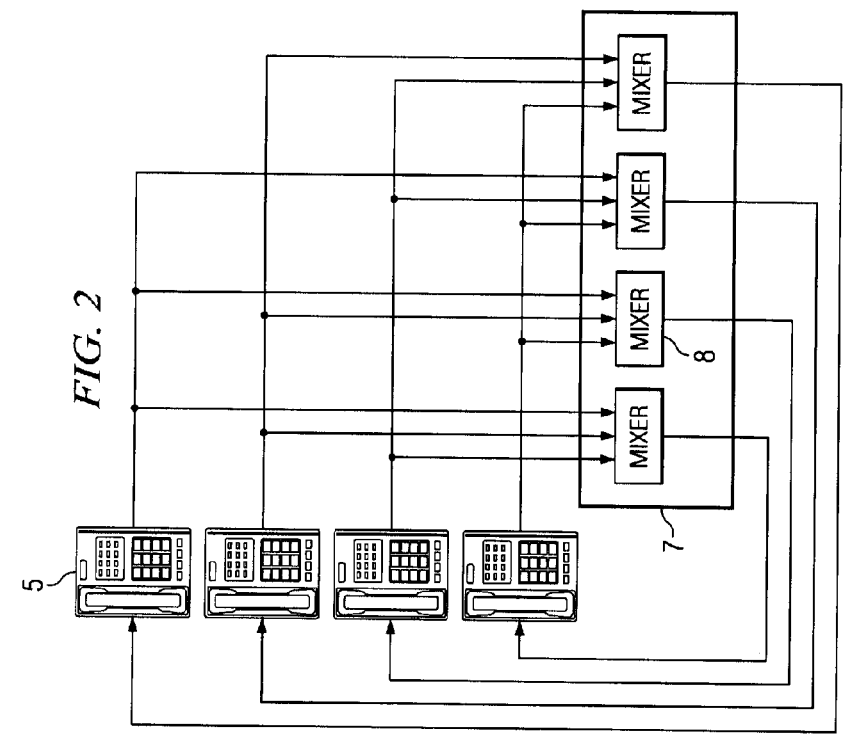

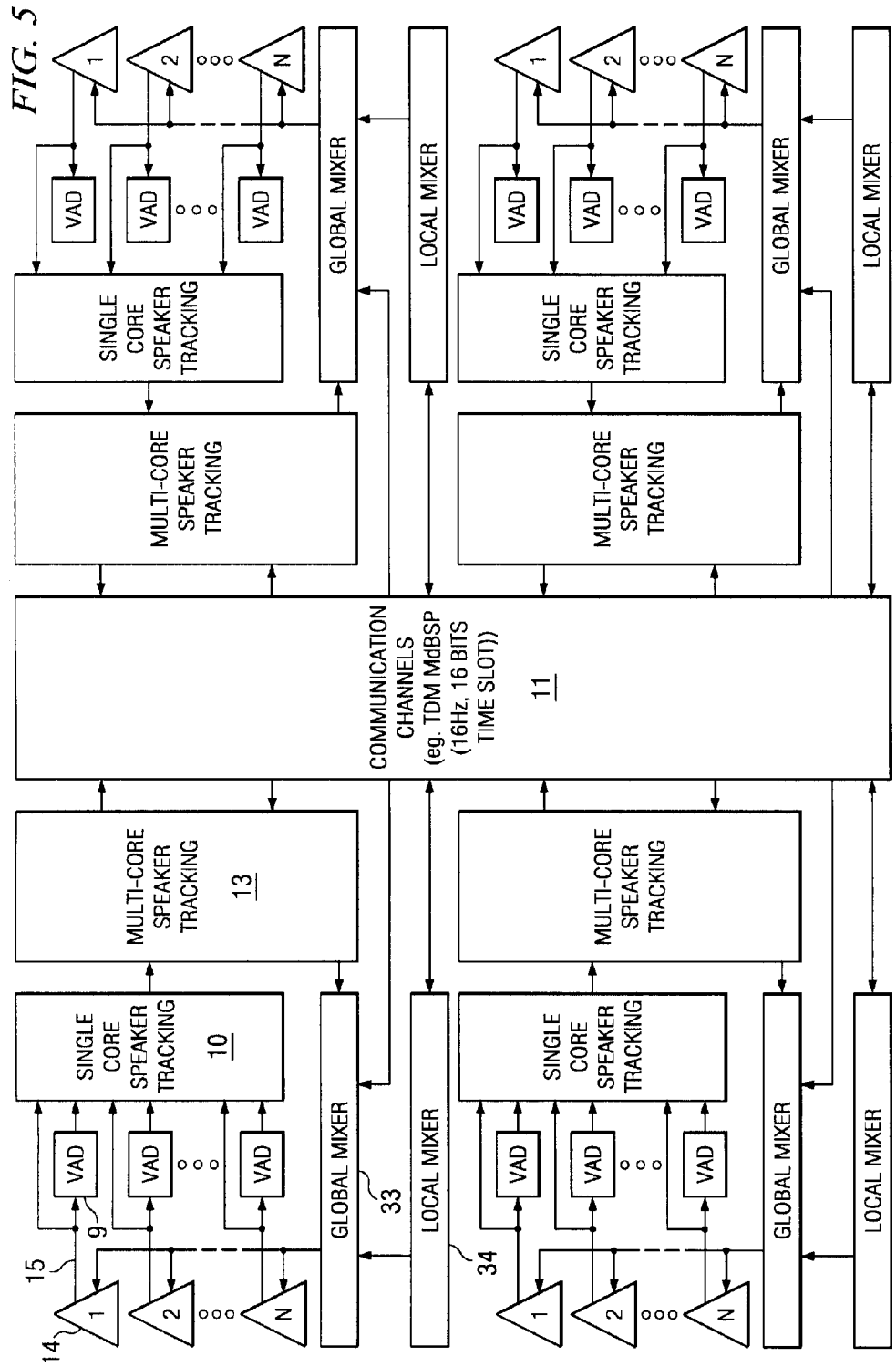

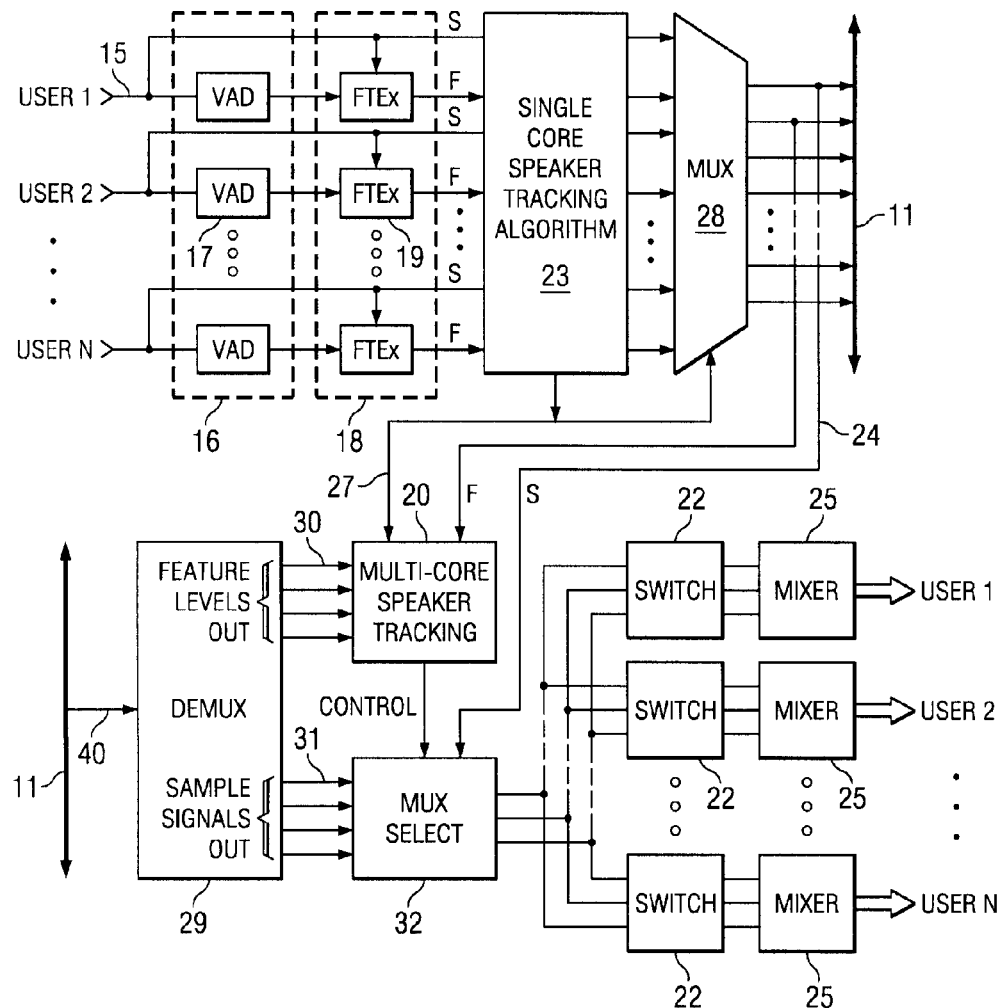
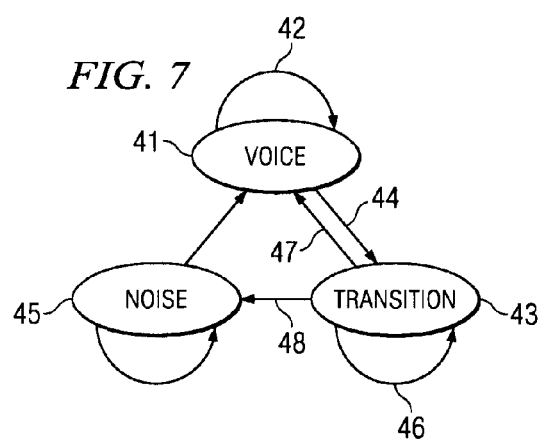

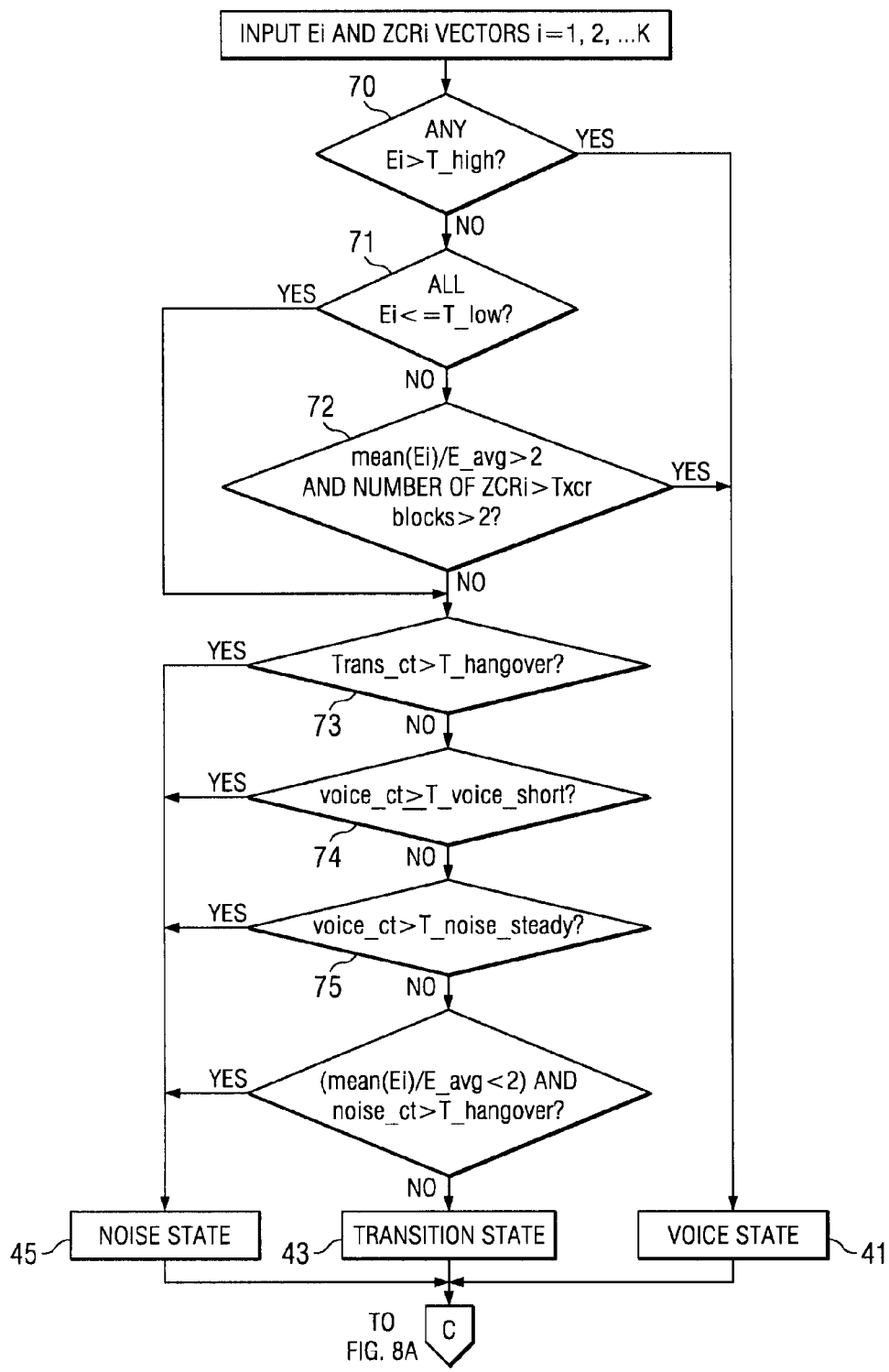

SPEAKER TRACKING ON A MULTI-CORE IN A PACKET BASED CONFERENCING SYSTEM

CROSS REFERENCE TO RELATED APPLICATIONS

This application is a continuation in part of application Ser. No. 10/123,310 filed Apr. 17, 2002 now U.S. Pat. No. 7,145,884 and patent application Ser. No. 10/123,483 filed Apr. 17, 2002 now U.S. Pat. No. 7,020,257.

FIELD OF THE INVENTION

The invention relates to distributed processing telephony conferencing over packet networks. More specifically, the present invention relates to the tracking of multiple speakers across multiple cores of a packet based conferencing system.

BACKGROUND OF THE INVENTION

Conferencing allows multiple users to participate in the same call on a dynamic basis. A single call can be established and additional users can be added or deleted on a dynamic basis.

FIG. 1 illustrates a representative prior art digital telephony conferencing system. The conferencing system consists of numerous participants at locations 1 through n. One or more telephones 5 may be located at each location. A multiplexing and demultiplexing device 4 connects each of the telephones to the conference bus 3. Some locations may have only a single user, while other locations may have multiple users. Each user will be individually connected through a multiplexer 4. A bus 3 conveys the signal information generated by each participant to all other participants of the system.

FIG. 2 illustrates the use of a single core for processing the signals from the various locations illustrated in FIG. 1. All of the telephones 5 are connected to a common core, such as a DSP core 7. The DSP core 7 has a number of channels, each participant telephone 5 is accommodated by a channel. Each channel acts as a router for receiving the audio signals from the telephone connected to the channel. The core 7 also has a plurality of mixers 8 for providing audio signals out to each of the telephones 5. The mixer for each telephone sums the signals for all other telephones and provides this signal to the particular telephone served by that mixer. The mixer does not provide a telephone with its own signal because the speaker would hear an echo of his own voice.

Each of the signals from each of the telephones has noise associated with the signal. The noise can be background noise or other noise. The mixing operation, a summation of all signals, causes the noise level to increase at each of the telephones. The increase in noise can limit the number of participants and/or can have an adverse impact on the quality of the communication. Therefore, it is desirable to eliminate some of the noise by muting one or more of the individual participant signals.

The use of a single core for a conference call also reduces the total number of participants which is limited by the number of channels on a single core. Further, the transmission of background noise, as well as the transmission of other speakers in addition to the primary speaker places an additional load on a communications system. A system must identify the primary speaker or speakers to mute noise not associated with the primary speaker or speakers.

When a number of people participate in a telephony conference, there is a significant likelihood that two or more participants will speak at the same time. It is also likely that background noise originating at one or more group nodes will be transmitted through the conferencing system. The transmitted signals of the background noise and multiple speakers interfere with the signal that is of interest to the conference participants. These interfering signals impair the ability of the conference listeners to hear and understand the speaker that is of interest to them and thereby reduce the quality of the communication.

SUMMARY OF THE INVENTION

The present invention reduces the unnecessary use of communication resources to support the communication of signals that will ultimately be muted and reduces the processing demands on a conferencing system.

The use of distributed processing and multiple cores by the present invention allows the number of conferencing nodes to be greater than the number of channels on a single core. All of the conferencing nodes may be set up at different cores. Alternatively, some of the cores of the distributed system may support more than one node. The bandwidth for communication between cores is less than the bandwidth within a single core. The limitation on communication bandwidth is addressed by the present invention. The present invention teaches active speaker tracking and mixing operation for improved performance in distributed multi-core conferencing systems.

The present invention utilizes low-delay voice activity detection. The present invention also teaches speaker tracking implemented for speakers from a single core and speaker tracking for speakers from multiple cores. The mixing operation is optimized based upon speaker tracking to reduce the cumulative noise summing effect and a communication algorithm which provides effective system control.

The system of the present invention is implemented with low complexity to minimize processor and memory resource requirements. The present invention provides high quality communications capable of tolerating a significant range of noise conditions.

A distributed intelligence conferencing system, as illustrated in FIG. 3, is disclosed, having a plurality of conferencing nodes 12 connected to a communication bus 11. Each of the conferencing nodes can connect one or more participants to the conference and has feature measuring devices for measuring various features of a signal, such as power level and zero crossing rate on each of a number of participant input signals; a processing device, interconnected with the feature measuring device, for determining the relative features of each of the number of participant input signals; and a communication device, interconnected with the processing device, for communicating the measured features and the signals for a plurality of participant input signals to the other conferencing nodes.

Each node 12 of the system measures the features of each of the conference participants connected to that node. The processor in the node identifies the strongest signals. The three strongest signals are identified in the exemplary embodiment, however, a greater or lesser number may be identified depending on the implementation of the present invention. Each node 12 provides the signal features and signal sample of its three strongest signals to the other nodes through the bus 11. The nodes then compare each of the three strongest local signals to the strength of the received signals and determines if the local signals should be included in the conferencing group signal provided to the participants in the conference. In this manner, the system can track the strongest individual speakers from among the multiple speakers in the conference distributed across the plural nodes.

BRIEF DESCRIPTION OF THE DRAWINGS

Exemplary embodiments of the present invention are discussed with reference to the following drawings:

FIG. 3 is a simplified block diagram illustrating a representative conferencing system of the present invention.

FIG. 5 is a block diagram of the functional configuration of an exemplary distributed conferencing system of the present invention illustrating the global mixer and local mixer.

FIG. 6 is a block diagram illustrating an exemplary representative structure of a conferencing node of the conferencing system of the present invention.

FIG. 7 is a state diagram illustrating the voice activity detection states of the present invention.

FIGS. 8A through 8D are logic flow diagrams illustrating the voice activity detection of the present invention.

DETAILED DESCRIPTION OF THE INVENTION

Figure 1:
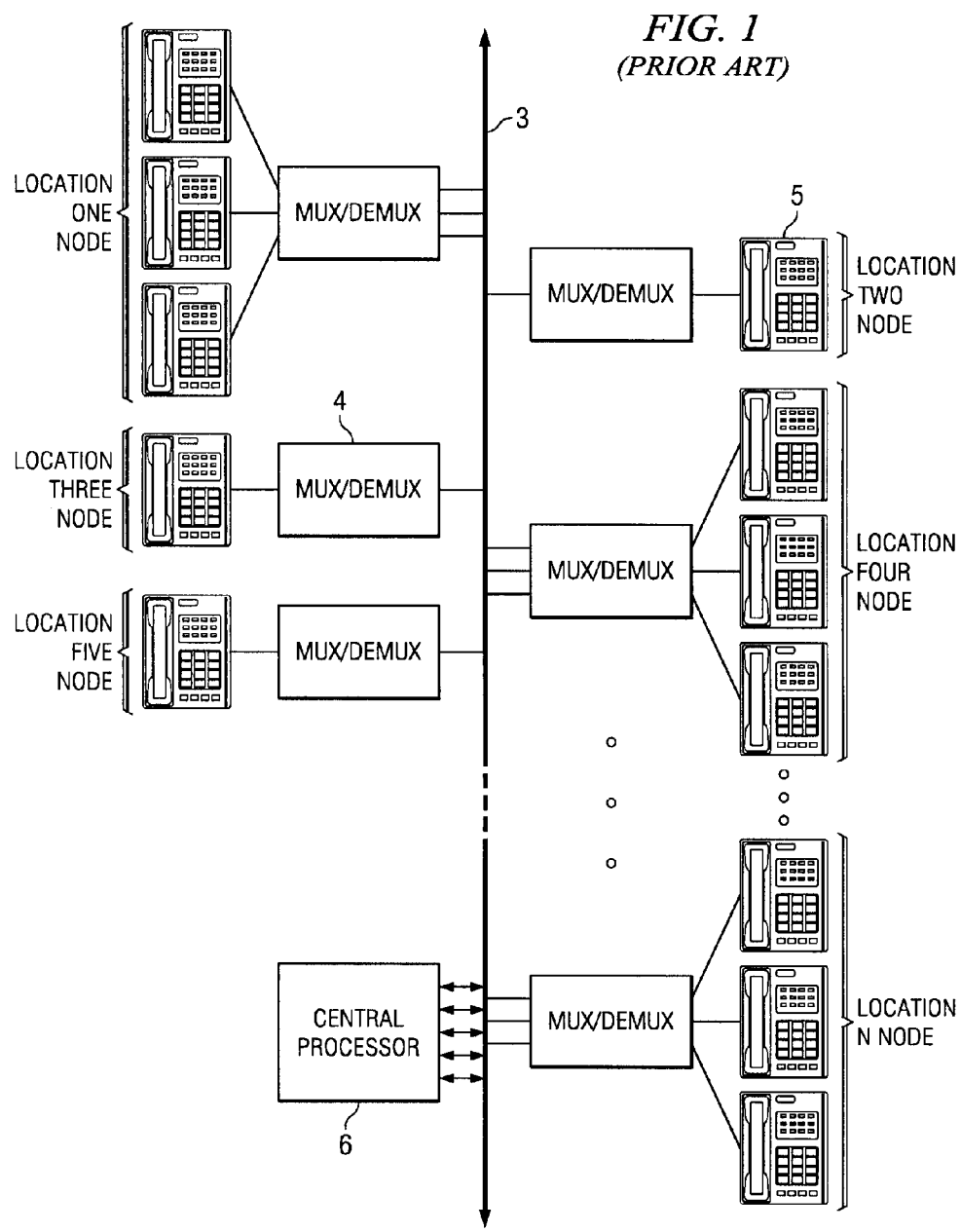
FIG. 1 is a block diagram illustrating a representative prior art digital telephony conferencing system.
Figure 4:
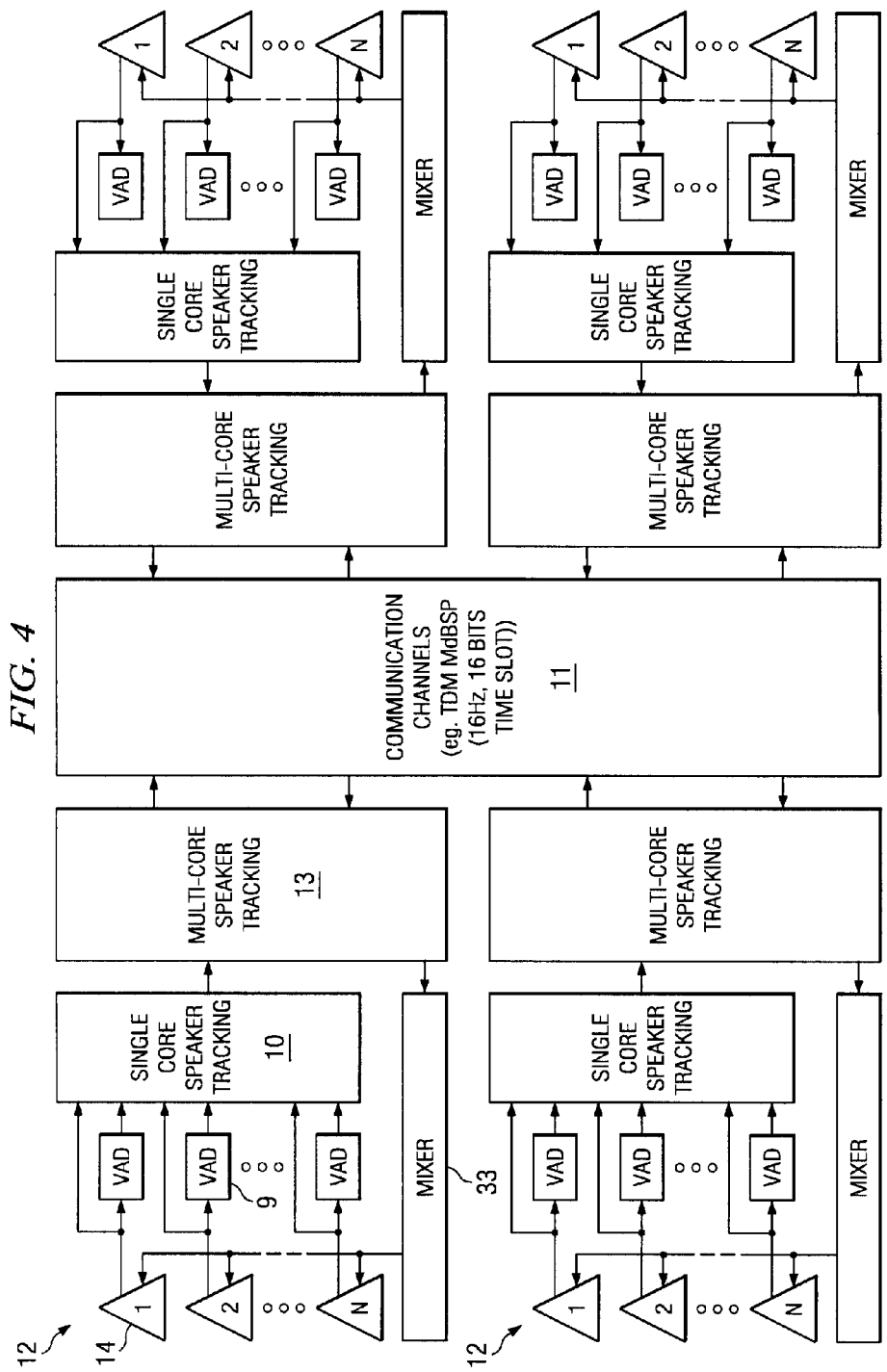
FIG. 4 is a block diagram of the functional configuration of an exemplary distributed conferencing system of the present invention.

FIGS. 3, 4 and 5 illustrate a representative conferencing system of the present invention. FIG. 3 illustrates the overall physical structure. FIGS. 4 and 5 illustrate the overall functional or logical components of exemplary embodiments of the present invention. The conferencing system contains a number of conferencing nodes 12 identified by their respective group numbers group 1 through group n. Each node 12 is capable of providing conferencing support to multiple participants or users 14 that are connected to the node 12 by separate communication channels 15. Communication between the multiple nodes 12 is accomplished via a bus 11. The bus can be for example a TDM bus.

FIG. 4 also illustrates the voice activity detection 9, single core speaker tracking 10 and multiple core speaker tracking 13 within the DSP core. In the exemplary embodiment of FIG. 4, there is no local mixing of the speaker signals. The mixer 33 mixes the signals for each of the users 14 from the multi-core tracking 13 after communication from the TDM bus 11. FIG. 5 illustrates an embodiment with local mixing 34 as well as the global mixing 33.

FIG. 6 illustrates an exemplary representative structure of a conferencing node 12 in greater detail. A number, n, of separate participants or users 14 are connected to this node 12 by communication channels 15. In an exemplary embodiment of the invention, node 12 is comprised of a DSP that is capable of supporting a number of communication channels 15. Each channel connects one of the users 1-n to the DSP. Each DSP may provide communication to one or more participants, depending on how many users are connected. In the exemplary embodiment, voice activity detection module 16 of the DSP, has voice activity detection 17 capabilities and receives the signal s on the communication channel. The signal s is also feed directly to the single core speaker tracking algorithm 23 and to the feature extraction module 18 which has feature extraction capabilities FTEx 19, to measure features such as the power, short term energy, long term energy, zero crossing level and other desired features of the signal on each communication channel 15 during some portion of the frame period, τ. In a preferred embodiment, the features are periodically obtained during each 0.5 msec of a 2.5 ms frame period. The decision, ie voice or not voice v/n, from each VAD 17 is also sent to its respective FTGEx 19. Based upon the determination of the VAD, the FTEx will extract features from the signal if the signal has been identified as voice. The features f are sent to the single core speaker tracking algorithm 23 along with the signal s.

The extracted features f corresponding to the signals s, are provided to a single-core speaker tracking algorithm 23. The present invention recognizes that the feature extraction and signal from the individual participants may require signal processing, such as commonly applied to remove distortion or hystorisis. Single-core speaker tracking algorithm 23 compares all of the features of each of the users 15 provided to single-core algorithm 23 from module 18 that were measured during frame period τ and processes the information as described below in reference to FIGS. 7 and 8. Although the preferred embodiment of the invention identifies a certain number of signals for tracking, a different number of signals may be identified depending upon the specific implementation of the present invention. Once the single core speaker tracking algorithm has made its determinations, the output of the single core speaker tracking algorithm 23 is output 27 both to the multi-core speaker tracking algorithm 20 and to the multiplexer 28. Multiplexer 28 also receives the signals s and the extracted features f from the participants connected to the node. Multiplexer 28 mutes selected ones of the signals based upon the results of the speaker tracking algorithm. The muted signals are not placed on the conference bus 11, so that the conference listeners, including those in the current node, will not hear these signals. The non-muted signals and their associated features are placed on the conference bus 11 by the multiplexer 28.

Multi-core speaker tracking algorithm 20 receives the results 27 of the single core speaker tracking algorithm 23, receives the extracted features f of the signals passed by the Multiplexer 28 and also receives measured feature information 30 pertaining to other participants in other groups of conference participants that are connected to other conference nodes of the system. The feature information from participants at other nodes is provided to multi-core algorithm 20 through the bus lines 30 connecting it to a demultiplexer 29. The features of signals from other nodes is used to compare with the feature measurements of the signals from the current node to determine which signals from which participants connected to the conference will be transmitted to the participants 1 through n of the current node. A control signal CNTL is sent to the multiplexer 32 to instruct the multiplexer 32.

Demultiplexer 29 receives the TDM frame 40 from the TDM bus 11 and demultiplexes the feature information and selected signals provided by the other nodes. The feature level information is provided to multi-core algorithm 20 on data lines 30 and the selected signals are provided to multiplexer selector 32 on data lines 31. Multiplexer 32 provides the signals to an input of each of the switches 22 which in turn provide the signals to mixers 25 which in turn provide an input to an associated user. The switches 22 exclude the signal corresponding to the associated user, if such signal is included in the aggregate from the multiplexer 32. The mixers 25 provide the aggregate of all participant signals as an input to each associated participant's telephone, except for the input signal generated by the associated participant himself, to avoid an echo of one's own signal. A participant does not receive his or her own signal, just as one does not receive his or her own signal in the telephone speaker for any other type of telephone call.

Multiplexer 32 receives signals of participants from other nodes on lines 31 and signals of the current node participants s on line 24 from the multiplexer 28. Multiplexer also receives control signal CNTL from multicore speaker tracking algorithm 20. Based upon the control signal, multiplexer 32 send the selected signals to the participants of the current node through switches 22 and mixers 25. Because the signals sent from the multiplexer 32 may contain the signals of participants on the current node, switches 22 mute any signals which correspond to the user to which the switch is connected. Mixers 25 then mix the remaining signals and provide the signals to the users 1-n.

Each node separately pre-screens (single-core speaker tracking) the signals of the local participants, reducing the number of samples transported by the communications system. Because each node need only process up to three local signals and up to three signals from remote nodes, the total system processing bandwidth resources needed to support a conference call is distributed, can be conduced in parallel, and is reduced.

Speaker tracking consists of identification of the presence of speech on a signal from a particular participant and determining the relative strength or volume of that speaker compared to active speakers. Speaker tracking is used to identify the speakers of interest for transmission in the conference and for muting of other signals from other speakers.

In order to implement speaker tracking, voice activity detection must be properly implemented. In an exemplary embodiment, a low delay VAD with a configurable fixed energy threshold, as illustrated in FIGS. 7 and 8 can be utilized. The VAD utilizes a 2.5 ms block for power measurements and zero crossing rate for identification of the beginning and end of speech. Each VAD frame can be divided into n blocks. The VAD makes decisions using 2.5 ms previous samples and current frame samples.

As illustrated in FIG. 7, the VAD has three states, Voice 41, Transition 43 and Noise 45. The state of the VAD is dependant upon the measured energy level Ei of the current signal block and the zero crossing rate and their distribution. A high threshold $T_{high}$ and a low threshold $T_{low}$, are used to differentiate voice and noise. Any signal energy blocks in the current frame above the high threshold $T_{high}$ are classified as voice. Signal block energies in the current frame below the low threshold $T_{low}$, are classified as noise. Signals between the two thresholds can be noise or voice and will be classified dependant upon the state of previous signal frame, background energies, zero crossing rates and their characteristics.

When in voice state 51, the VAD can remain in voice state or move to transition state. If the current Ei is above the high threshold $T_{high}$ than the VAD will remain in voice state 41. If the Ei is below the low threshold $T_{low}$, than the VAD will move to transition state 43 from which it can move to noise state 45. The VAD will not move directly to noise state 45 to reduce the likelihood of missclassification of a weak voice signal as noise and to avoid frequent clipping which can be caused if the state machine moves to noise state during brief pauses in voice.

When in voice state 41, the state will remain voice state as indicated by arrow 42 when:
 (a) any block energy (Ei)>high energy threshold (Th), or;
 (b) voice counter>voice count threshold (Tvc) and current ZCRi>ZCR threshold, or;
 (c) voice counter≦Tvc and Ei is twice the average E and ZCRi>the ZCR threshold, otherwise the state machine will move to transition state 43.

Figure 8A:
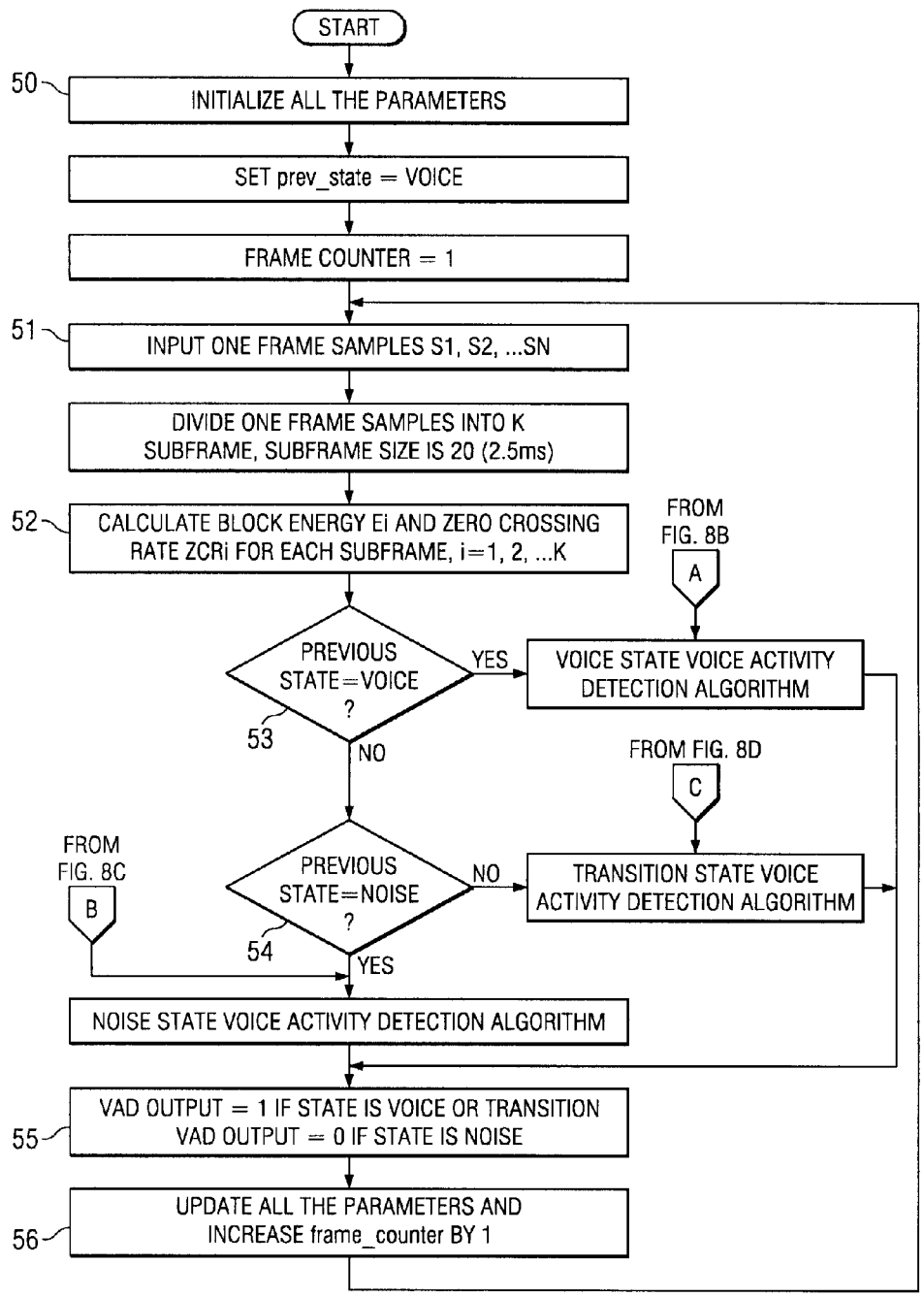

Referring to FIG. 8A, the VAD state machine implemented in the DSP or core software, begins it initial determination by initialization of a number of parameters 50. The high power level threshold $T_{high}$ is set to a level wherein signals above the level can be classified as voice with great confidence. The lower power level threshold $T_{low}$, is set to a level wherein signals below this level can be classified as noise with a great degree of confidence. A threshold for zero crossing rate is established and all counters are reset. The state machine is initially set to voice state and the frame counter is set to 1.

Figure 8B:
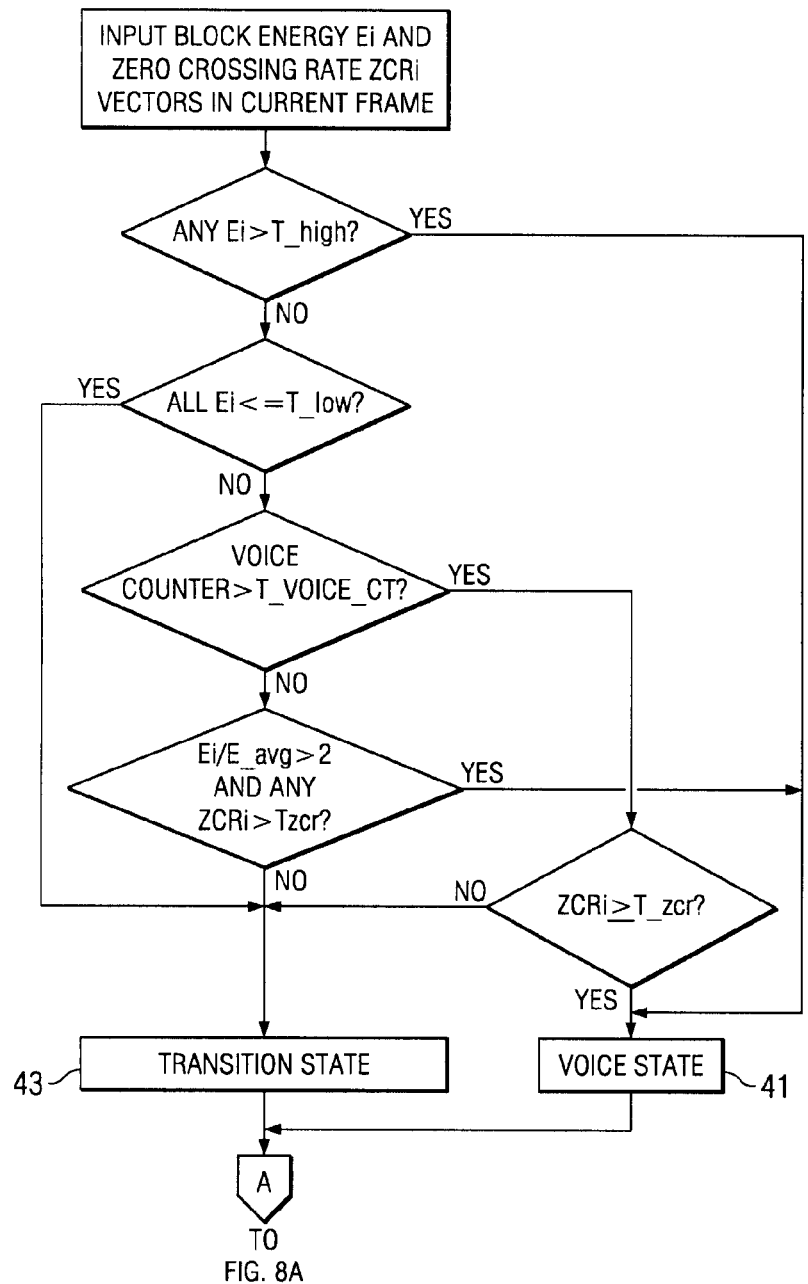

The VAD then accepts the current frame of samples 51, divides the frames into subframes or blocks (2.5 ms in the exemplary embodiment) and determines block energy Ei and zero crossing rate ZCRi for each sub-frame i and determines the average Ei for each frame. The mean sub-frame Ei for each frame and mean sub-frame ZCRi is also calculated. The state machine then determines the previous state in steps 53 or 54 and process the current frame accordingly as illustrated in FIG. 8B VAD voice state, 8C VAD noise state and 8D VAD transition state. Upon return, 55, the VAD output is set to 1 for voice or transition state and is set to 0 for noise state. The parameters and frame counter are updated 56 and the next frame samples are input 51.

As illustrated in FIG. 8B, the values for the block energy Ei and the zero crossing rate ZCRi vectors for the current frame are input. The VAD voice state algorithm first determines, if any Ei is above the high threshold Th. If any Ei is greater than $T_{high}$ than the VAD will remain in voice state 41 and flow will return to block 55 in FIG. 8A. If all Ei are less than or equal to $T_{low}$, than the VAD will move to transition state 43 and flow will return to block 55 in FIG. 8A. If Ei is between $T_{high}$ and $T_{low}$, then the algorithm will determine if the voice counter threshold and zero crossing rate threshold have been exceeded. If both have been exceeded, the state will remain voice and flow will return to block 55. If only the zero crossing threshold has been exceeded and the voice counter threshold has not been exceeded, the algorithm compares the current energy Ei to the average energy Eavg and if the current power level is twice the average or greater then the VAD remains in voice state 41, otherwise the VAD moves to transition state 43.

As illustrated in FIGS. 7 and 8D, once in the transition state 43, the VAD can remain in transition state, move to voice state, or move to noise state. The transition state VAD algorithm, as illustrated in FIG. 8D, receives the same power vectors and first 70 determines if any of the individual Ei values of the sub-frames exceeded Th. If any subframe exceeds $T_{high}$ the VAD moves to voice state 41. It is important to move to voice state if any sub-frame exceed $T_{high}$ to avoid valid voice signal being classified and discarded as noise. Alternatively, if the Ei of all sub-frames are below $T_{low}$, 71, then the VAD moves to noise state 45 because the frame is confidently classified as noise. The VAD can either remain in transition state or move directly to voice or noise state.

If the Ei of some of the sub-frames are between the high and low thresholds $T_{high}$ and $T_{low}$, and the means Ei is more than twice the average E and more than two ZCRi are above the threshold ZCR 72, the VAD also moves to voice state 41. If the Ei of some of the sub-frames are between the high and low thresholds $T_{high}$ and $T_{low}$, and the transition count is greater than the transition hangover threshold, 73 or the voice count is greater than the voice count short threshold 74 or the threshold for steady noise 75, the VAD moves to noise state 41. If not, the VAD remains in transition state and passes signals as voice.

Figure 8C:
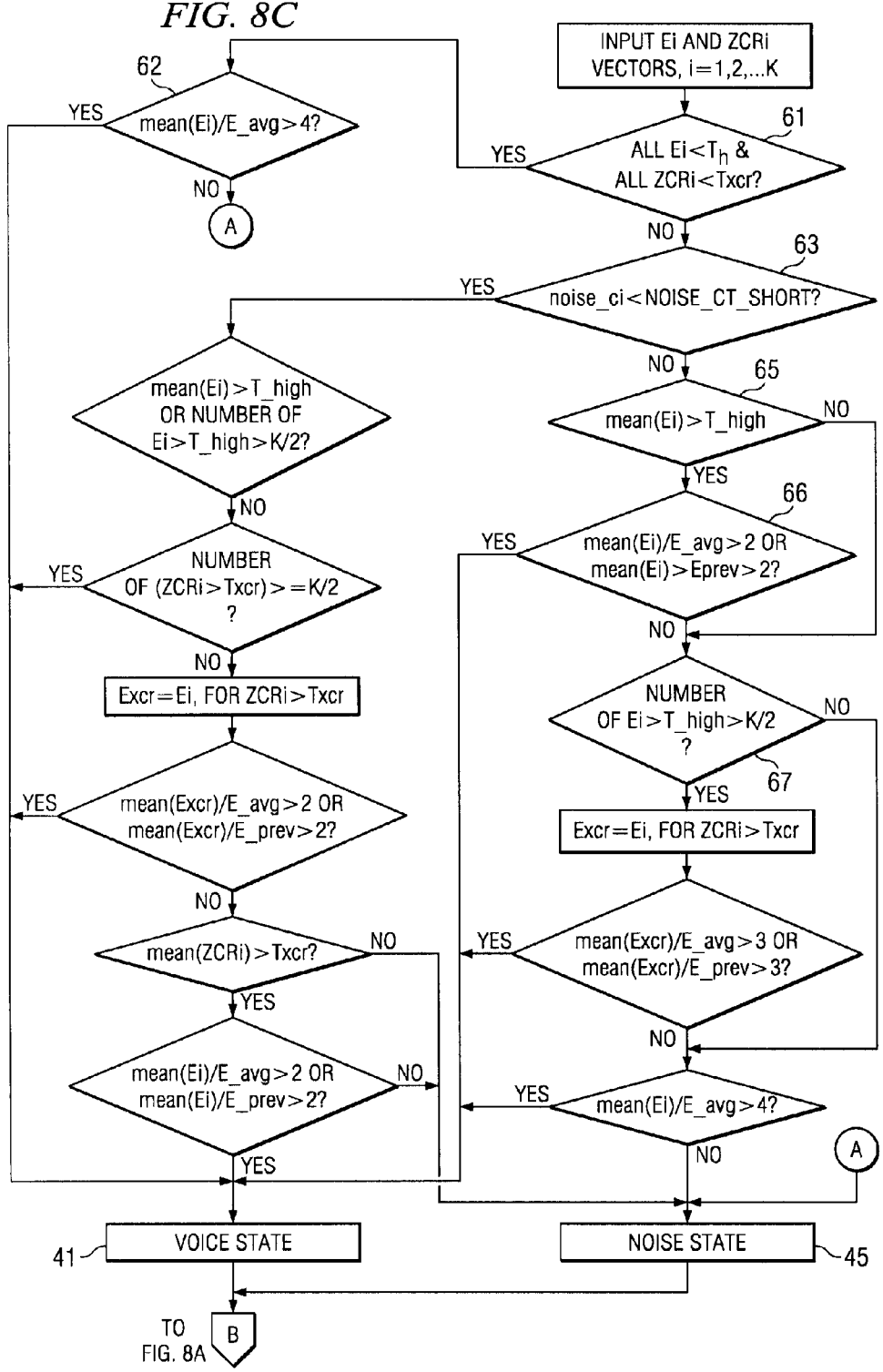

As illustrated in FIG. 8C if all Ei is less than $T_{high}$ and the zero crossing rate is less than the zero crossing rate threshold, 51, the VAD noise state algorithm will compare the mean value of Ei to the average value of Ei, 52. If the mean Ei is less than four times the average Ei than the VAD will remain in noise state 43. If the mean Ei is greater than four times the average Ei than the VAD will move to the voice state 41.

If, at block 51, Ei is not between the two thresholds or the zero crossing rate is greater than the zero crossing rate threshold, the noise count will be compared to the noise count threshold at 53. If the noise count has reached the noise count threshold "noise ct short" 53 and the mean Ei for the frame is greater than the high threshold Th, 55, and the mean Ei is greater than twice the average Ei of the previous E, 56 than the VAD moves to voice state 41. If the relationship between the mean Ei, average Ei and previous E does not move the VAD into voice state, the relationship between ZCR and average or mean energy will determine if the VAD moves to voice state.

Signals produced by voice and noise typically have different characteristics. Voice typically has a greater power level than noise. However, quite voice can have a power level close to or within the typical range of noise. Voice will however have a greater fluctuation. Therefore the present invention measures not only current power but average and mean power. This can reduce the clipping of the beginning or end of noise which can be at a lower power than sustained noise. It also can reduce the classification of random noise as voice.

The zero crossing rate is also a feature of the signals which can be used by the present invention. Typically the zero crossing rate for most voice is low and the zero crossing rate for noise is higher. The zero crossing rate for some speech such as consonants is higher than that for noise, while the power level can be lower. These elements of speech can be referred to as unvoice By tracking the zero crossing rate and the distribution, average and mean, a better differentiation between noise and voice can be achieved by the present invention.

For background noise or white noise the average power remains fairly constant as well as remaining fairly low. For active speech, the average power typically exhibits great variance. Typically voice is combined with un-voice, those aspects of speech which exhibit non-typical characteristics or features. This combination produces a feature set of greater variance in characteristics, including power level and zero crossing rate. This difference between speech and background noise is utilized by the present invention to assist in the VAD decisions.

By distinguishing voice activity from noise activity, certain signals identified as noise can be excluded from further processing. By excluding signals from the comparison process, processing resources can be conserved.

Figures 1, 9A:
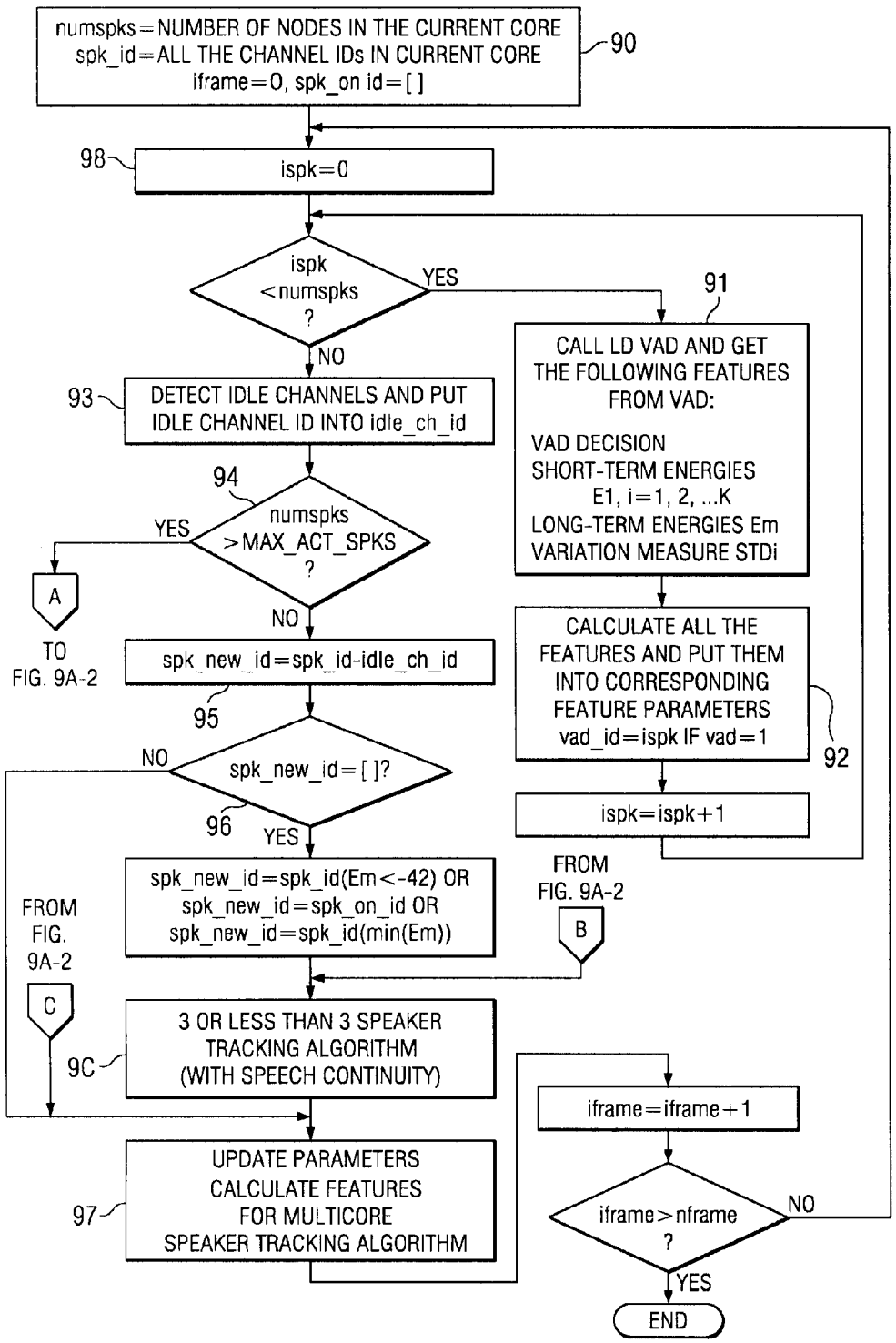
FIGS. 9A through 9C are logical flow diagrams illustrating speaker tracking for a single core.
Figures 2, 9A:
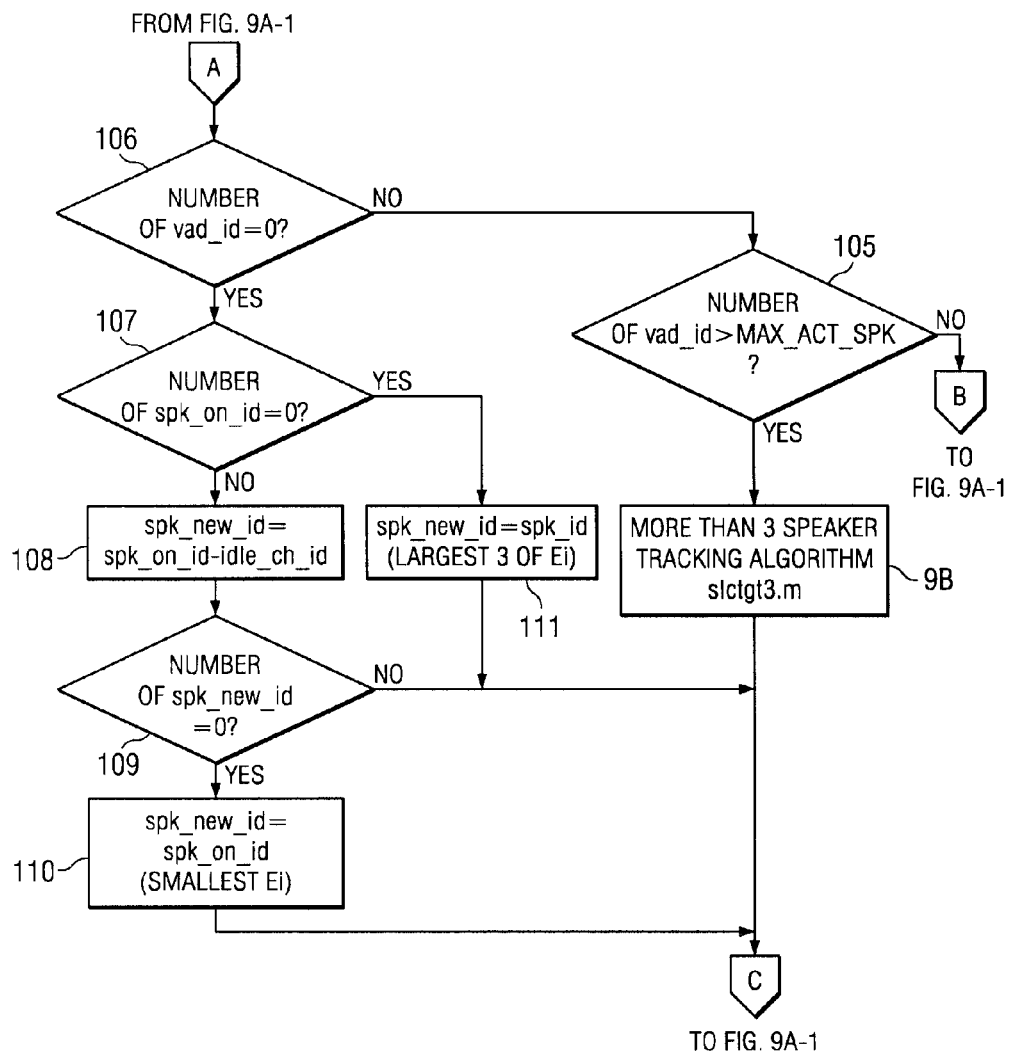
FIG. 2 is a block diagram illustrating the use of a single core for mixing and processing signals from various locations.
Figure 9B:
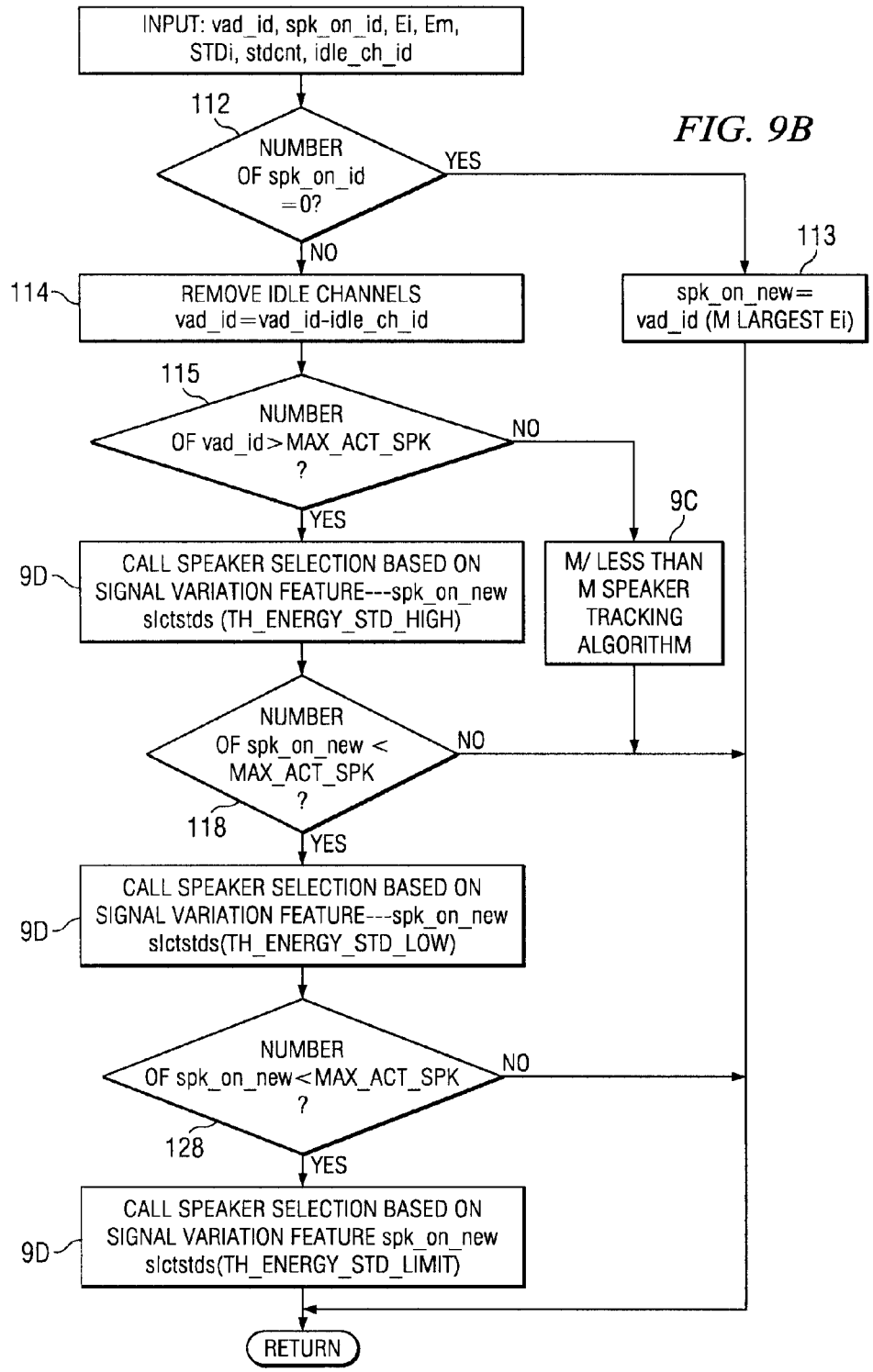
Figure 9C:
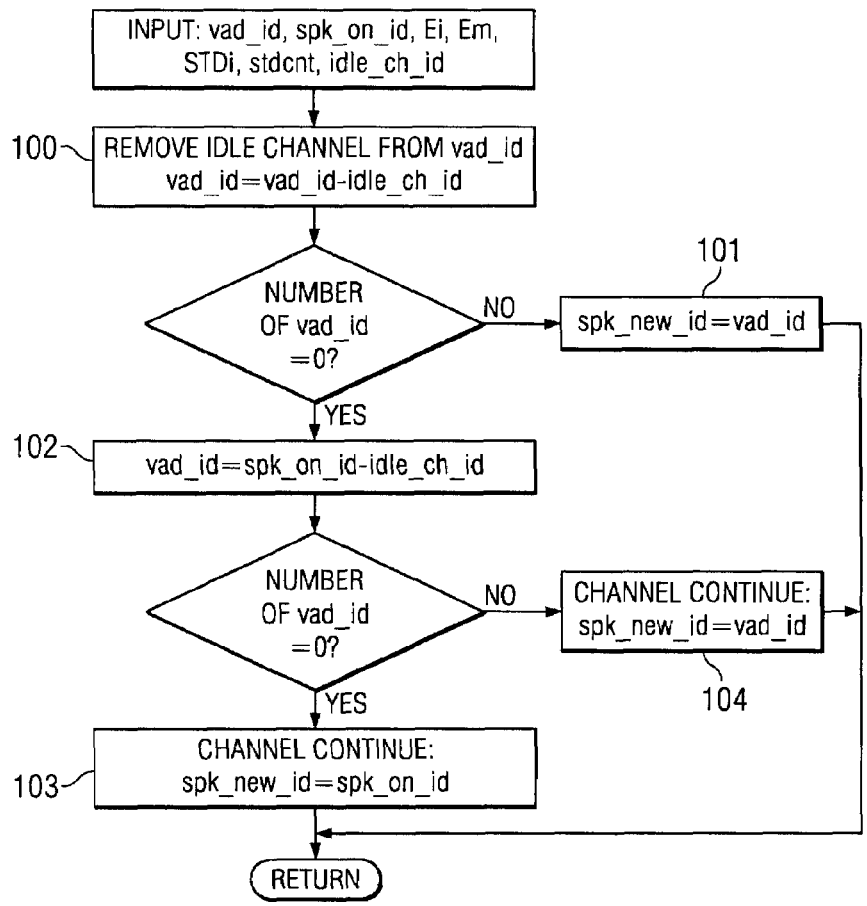
Figure 10A:
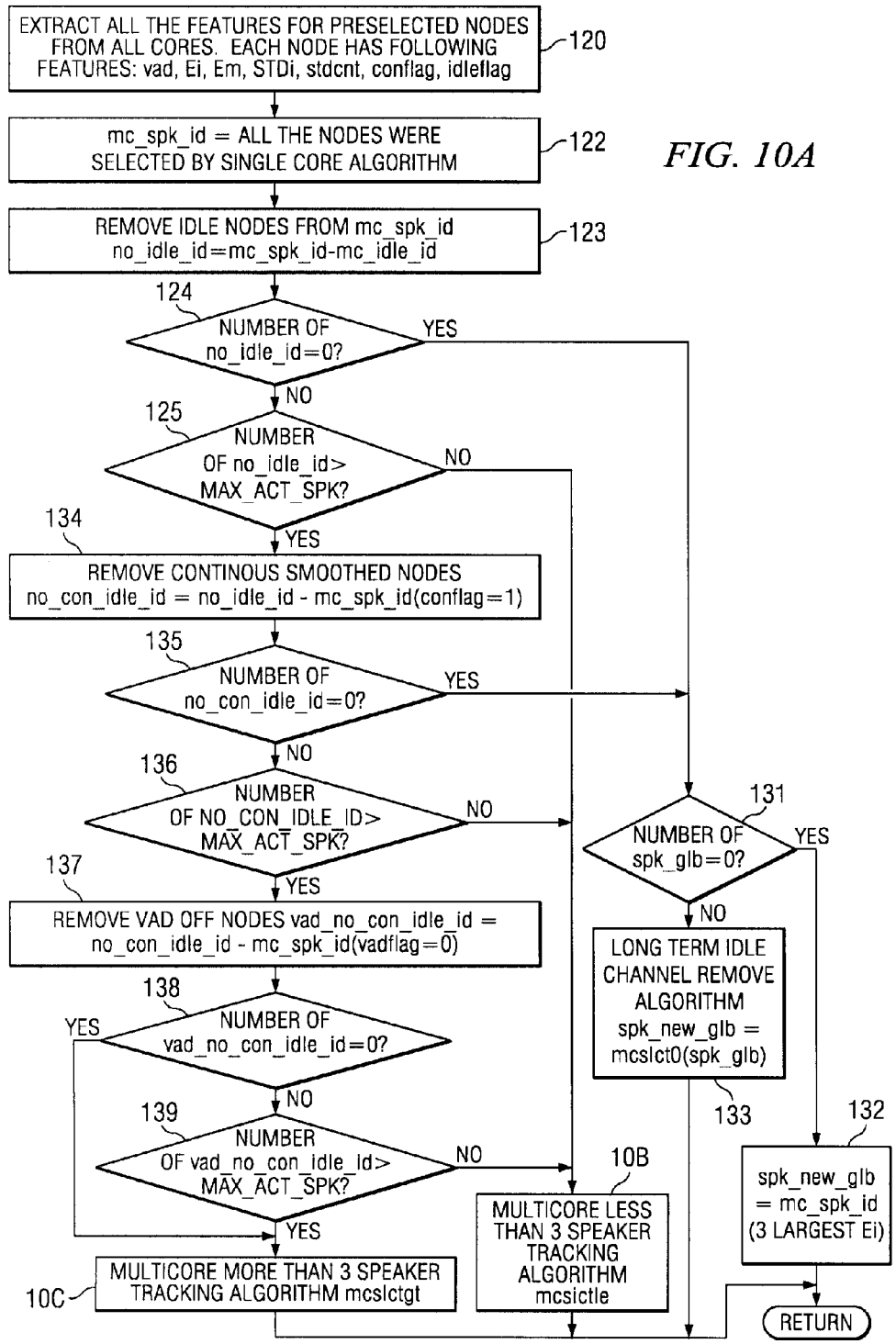
FIGS. 10A through 10C are logical flow diagrams illustrating speaker tracking for multiple speakers across multiple cores.
Figure 10B:
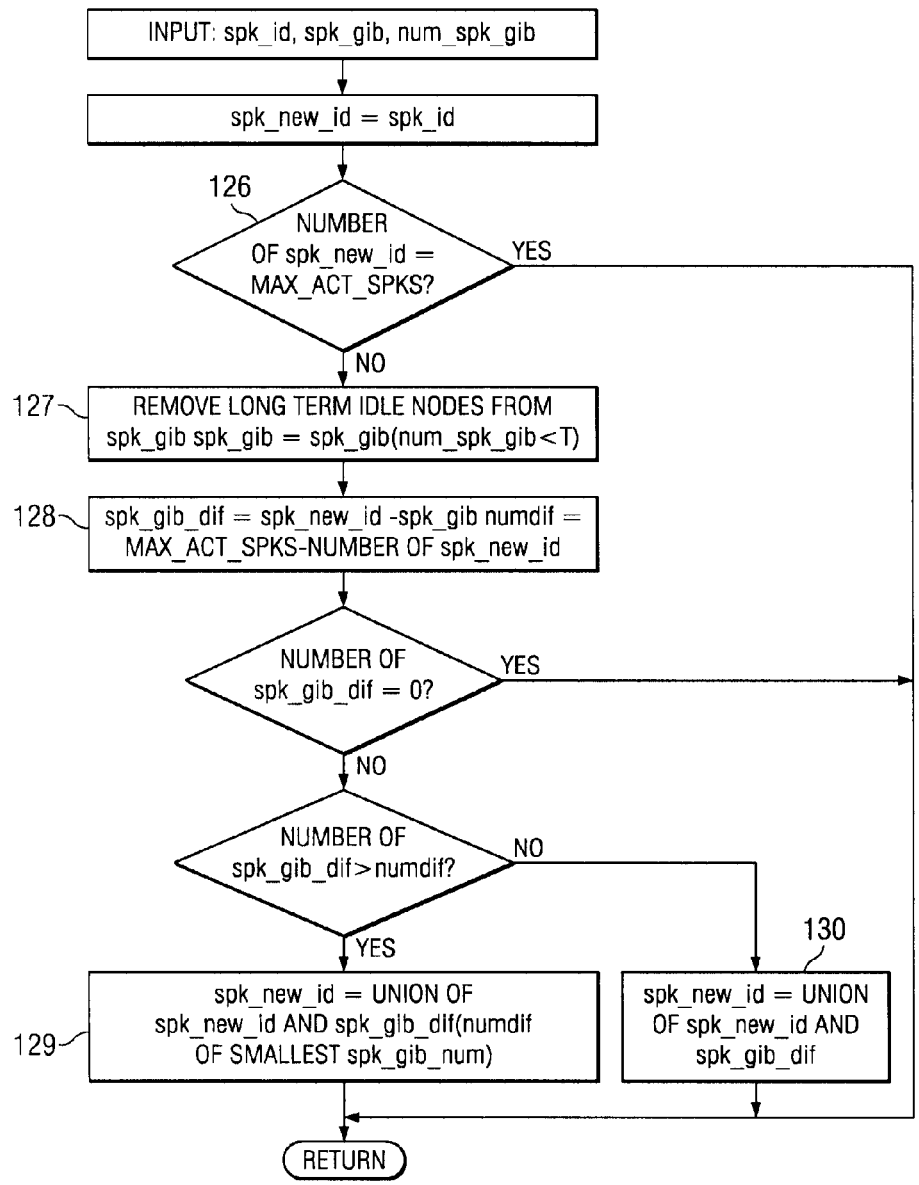
Figure 10C:
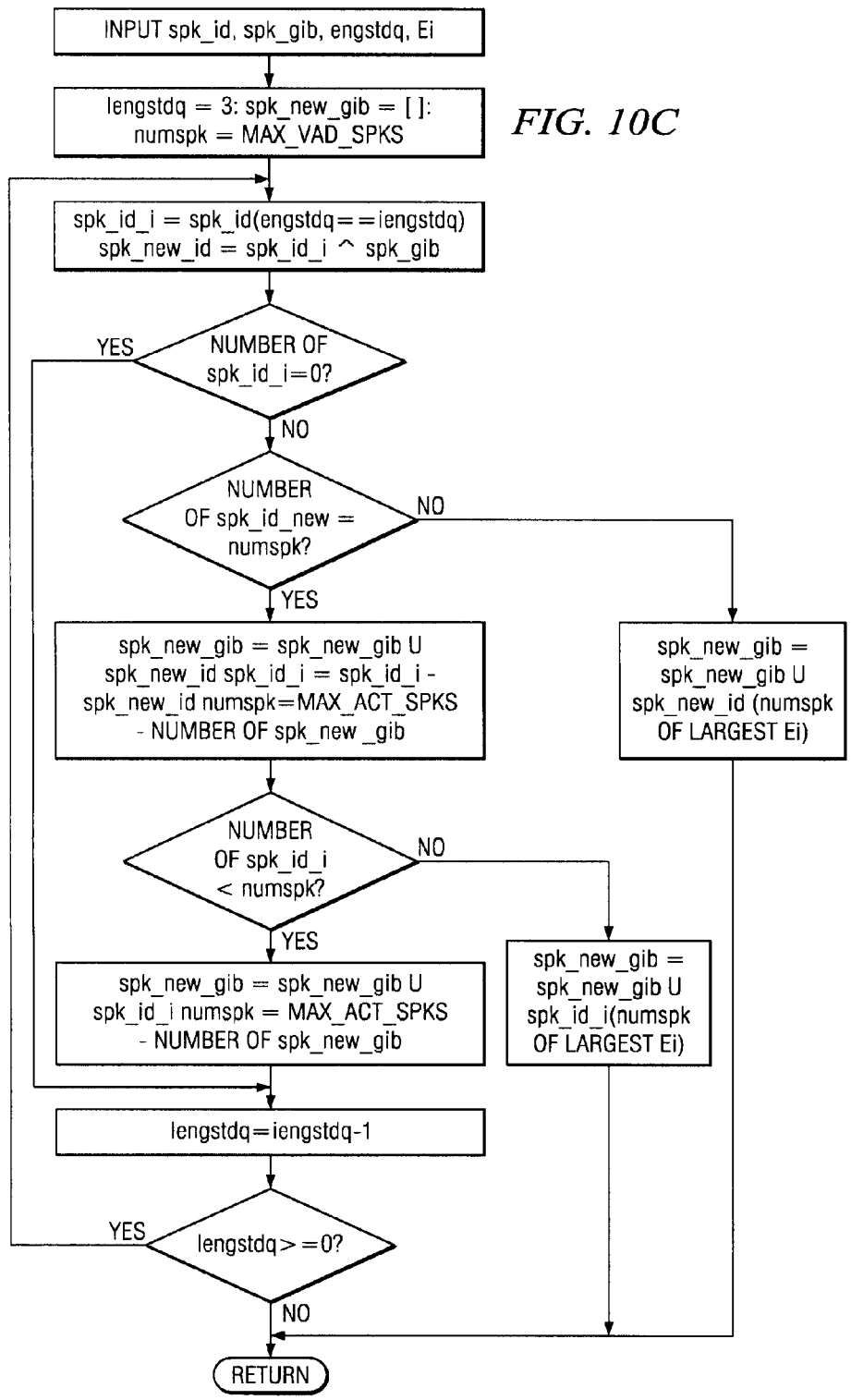

In order to track a speaker throughout the conference, the speaker is first tracked locally and then the local tracking can be followed across the multiple cores. FIGS. 9A through 9C illustrate the process for single core speaker tracking (local tracking). FIGS. 10A through 10C illustrate speaker tracking across multiple cores. In local tracking, first the process is initialized 90 by setting the number of speakers equal to the number of channels in the core. This is the maximum number of speakers possible for a single core. Next the current ith speaker value is set to 0.

The values for the ith speaker are then obtained from the results of the voice activity detection 91, as described above. The values for: VAD decision, ie. voice or noise; short-term energies Ei; long term energies Em; and variation measures STDi are collected. The validity of the speaker id is then determined based upon the VAD decision. If the signal from the speaker for the current frame was classified as noise by the VAD then the ith speaker is invalid. If the signal from the speaker for the current frame was classified as voice by the VAD then the ith speaker is valid, 92. The speaker number is incremented and values from the VAD are collected for the next speaker until values for all speakers are collected. The speaker tracking algorithm then detects idle channels, 93 and stores the identity of the idle channels for later comparison.

Next, 94, the number of speakers is compared to the allowed maximum number of active speakers M. The allowed maximum number of active speakers M is the numbers of speakers which are to be transmitted over the conferencing system to the other cores. In the exemplary embodiment described herein, each core can transmit a maximum of three speakers to be compared with the speakers from the other cores to determine the three active speakers for the conference. If the number of valid speakers is three or less, a check of the active speakers is made to determine if the identity of any of the active speakers is on an idle channel 95. Then the active speakers are also evaluated to determine if any of the active speakers are different from the active speakers from the previous frame, 96.

If there are active valid speakers, the parameters for the active speakers are updated, the features are calculated and the active speaker identifications, parameters and features are communicated to the other cores in the conferencing system 97. The frame is indexed to the next frame, the speaker number is reset 98 and the system gathers the next frame of information for the speakers on the core.

Otherwise, if there is a change in the identity of the speakers from the previous frame, the speakers are classified according to the signal of the frame under evaluation. Any speakers with a long term energy Em below −42 dBm are identified, as well as the speaker with the minimum long term energy Em(min) and any speaker which was "on" or active in the previous frame.

The less-than-or-equal-to-M speaker tracking algorithm with speech continuity FIG. 9C, is then implemented. Again the idle channels are removed form the active channels, 100. If any active speakers remain, 101, the speakers are set as the active speakers and the parameters for the active speakers are updated, the features are calculated and the active speaker identifications, parameters and features are communicated to the other cores in the conferencing system 97. The frame is indexed to the next frame, the speaker number is reset 98 and the system gathers the next frame of information for the speakers on the core.

If no channels remain in step 100, the previous frame of active speakers is checked and the idle channels are removed 102. If the vad id is non-zero, the channels are continued and the speaker id is taken from the vad id, 104 by choosing the remaining active speaker list channel speaker assignment otherwise continue with the previous frame assignment. The parameters for the active speakers are then updated, the features are calculated and the active speaker identifications, parameters and features are communicated to the other cores in the conferencing system 97. The frame is indexed to the next frame, the speaker number is reset 98 and the system gathers the next frame of information for the speakers on the core. If there are no remaining vad id's then in step 103 the speaker assignment from the previous frame is continued.

If the number of speakers in step 94 is greater than the allowed maximum number of active speakers M not all speakers can be sent to the conference and the speakers to be included in the conference must be identified. However, if the number valid speakers 105 is less than the allowed maximum number of active speakers M but greater than zero, all valid speakers are passed to the M-or-less-than-M speaker tracking algorithm, FIG. 9C. If the number valid speakers 105 is greater than the allowed maximum number of active speakers M the more-than-M speaker tracking algorithm, FIG. 9B, is implemented.

If there are no valid speakers, 106, then the active speaker from the previous frame, if one exists, 107, is set as the new active speaker, 108, unless this speaker is on an idle channel, 109, then the new speaker is the previous speaker with the smallest Ei, 110. If there are no previous active speakers, 107, the new active speakers are the current speakers with the largest Ei, 111.

FIG. 9B illustrates the algorithm for determining which speakers to track when the number of speakers and the number of valid ids both exceed the allowable maximum number of active speakers. When there are more valid and active speakers than allowed (three speakers are allowed in the exemplary embodiment), then the M number of strongest speakers must be identified to be passed through to the conference.

If there are no previous active speakers, 112, the active voice (vad) speakers with the largest Ei are identified, 113, and processing returns to block 97 of FIG. 9A. The parameters for the active speakers are then updated, the features are calculated and the active speaker identifications, parameters and features are communicated to the other cores in the conferencing system 97. The frame is indexed to the next frame, the speaker number is reset 98 and the system gathers the next frame of information for the speakers on the core until the last frame is processed.

If some of the speakers which were previously active speakers remain as active valid speakers in step 112, then, the idle channels are removed, 114 and the remaining # of active speakers is compared to the maximum allowable number, 115. In the exemplary embodiment, if the number is three or less, the speakers are processed according to the three-or-less speaker tracking algorithm of FIG. 9C. If the number of active, valid, non-idle-channel speakers remains greater than three, the strongest three speakers are determined by a comparison of the signal features of each speaker as illustrated in FIG. 9D.

Figure 9D:
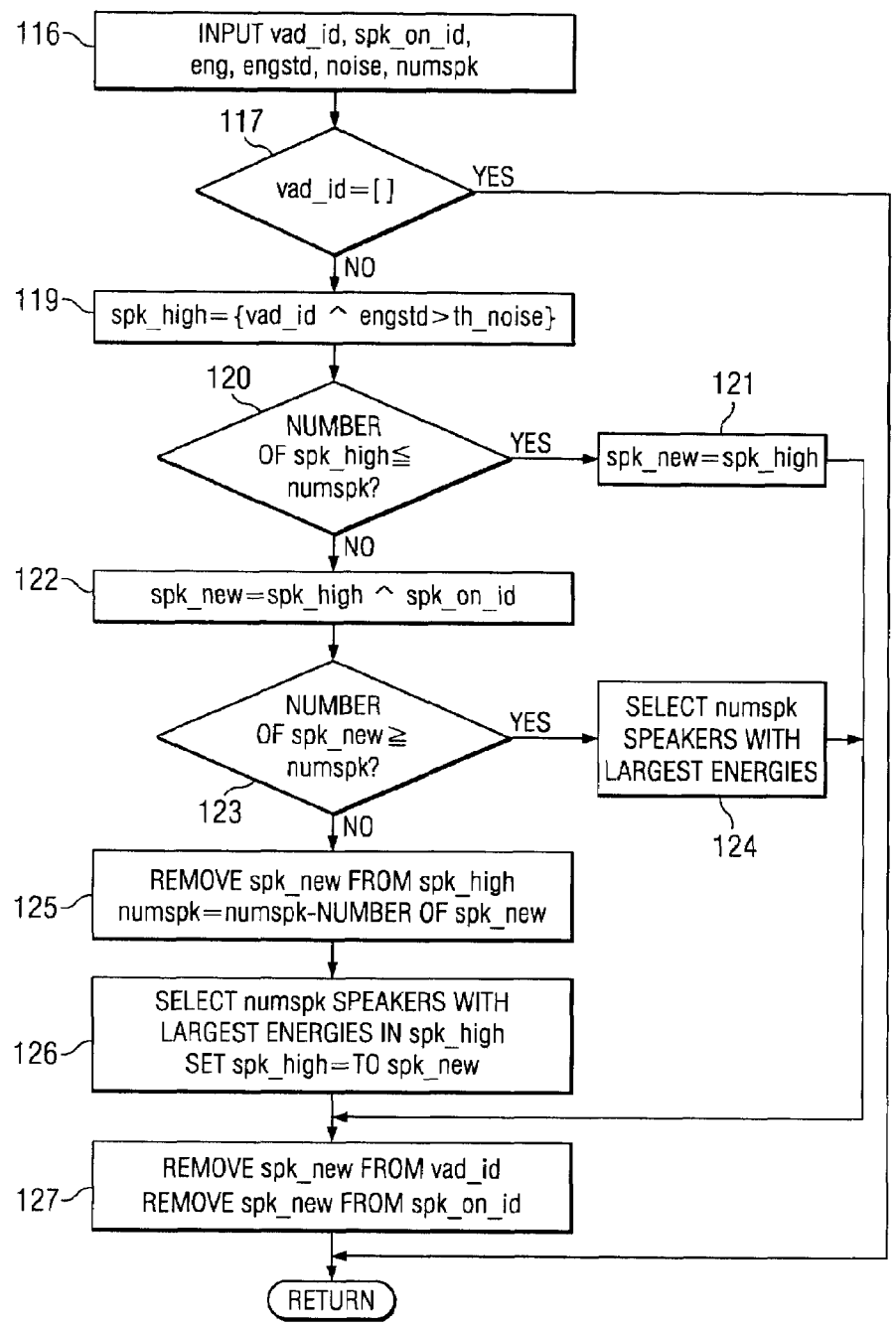
FIG. 9D is a diagram illustrative of an implementation of the speaker selection based upon signal features.

FIG. 9D illustrates the implementation of the speaker selection based upon signal features. The id's of the speakers identified as active voice by the VAD; the current active speakers id; the energy and standard energy; noise and number of speakers are input 116. The first time through this algorithm, the threshold energy standard is set high. If theses settings result in no remaining active speakers, 117, then flow returns to FIG. 9B, block 118, otherwise the number of speakers with energy above the noise threshold is determined, 119. If the number of speakers with energy above the noise threshold is less than the maximum number of speakers allowed 120 then these speakers are set as the new active speakers 121. The new active speaker ids are removed from the vad id and the speaker on id, 127 and flow returns to FIG. 9, block 118.

If the number of speakers in 120 is above the maximum number M, then the number of new speakers in the group is determined 122. If there are more new speakers than the allowable maximum M, 123, than the speakers with the largest energies are selected 124. The new active speaker ids are removed from the vad id and the speaker on id, 127 and flow returns to FIG. 9B, block 118. If there are an insufficient number of new speakers at 123, the new speakers are removed from the number of high speakers 125 and the number of speakers with the largest energies are selected, 126.

Upon return to block 118, if the number of active speakers is now less than the maximum allowable number of speakers, than the speaker selection algorithm FIG. 9D is again run with the threshold standard energy set low to add more speakers. If upon return to block 128, if the number of active speakers remains lower than the maximum allowable number of speakers, than the speaker selection algorithm FIG. 9D is again run with the threshold standard energy set at its limit to add additional speakers until the number of active speakers is determined.

Once the local speakers of interest have been determined in the single core algorithm 23, the multi core algorithm 20 is implemented as illustrated in FIGS. 10A through 10C. First, steps 120, 122 and 123, the features of the signals from all of the active nodes are collected. There are a number of common features found across the many cores of the systems which can be shared with a minimum of bits using message passing encoded with the voice signals. In the exemplary embodiment, the VAD decision occupies one bit, short-term energy and long-term energy occupy 6 bits each, the continuity state and idle state each occupy one bit, the quantized variation measure occupies two to seventeen bits and the quantized noise counter occupies five or six bits.

Next 123 the idle channels are removed. If the number of non-idle channels is greater than zero 124 and is less than or equal to the set maximum number of allowable speakers 125 (set to three in the exemplary embodiment) then the multi-core three or less active speakers algorithm, FIG. 10B, is utilized to determine the active speakers for all participants to hear.

The three or less speakers algorithm, FIG. 10B, determines that the appropriate number of speakers are present and distributes the signals accordingly. The algorithm will first determine if the number of new speakers is equal to the maximum number of active speakers 126. If it is determined that there are enough new active speakers, the active list is returned to the algorithm of FIG. 10A. If there are insufficient new speakers, the algorithm must analyze and remove unwanted signals through such techniques such as checking for long term idle 127 and stagnant speaker ID's 128. A combination of new and previous speakers 129 and/or 130 is returned to the algorithm of FIG. 10A.

If, in step 124, the number of non-idle channels is equal to zero, then the algorithm must determine the strongest channels from the idle channels in steps 131, 132 and 133.

Once the determination has been made based upon energy Ei or removal of the longer term idle channels, the designation of channels is made.

If the number of non-idle channels is non-zero but greater than the maximum number of active speakers, a determination of the speakers to be included as active speakers must be made. Continuous smooth nodes are removed 134 and if the number of non-continuous-idle channels is reduced to zero 135, the process of steps 131-133 is implemented. If the number of non-continuous-idle channels has been reduced to less than or equal to the maximum allowable active speakers, 136, then the three or less active speakers algorithm of FIG. 10B is utilized. Otherwise, any nodes with the VAD detection returning an off flag are removed 137 and the number of VAD-active non-continuous-idle channels is again determined 138.

If the number of VAD-active non-continuous-idle channels is less than or equal to three then the algorithm of FIG. 10B is utilized. Otherwise the algorithm of FIG. 10C is used to determine which of the speakers should be used when a greater number of speakers is active.

In FIG. 10C, the power levels as well as the additional features extracted from the signals are examined and compared until the maximum number of speakers are identified as the strongest speakers.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A multiple core speaker tracking system in a distributed conferencing system, comprising:
    a system communication bus;
    a plurality of nodes connected to said system communication bus, each of said plurality of nodes comprising:
        a state machine for receiving a signal from each of a plurality of local participants connected to said node for classification of said signals as voice or noise and for producing a indicator of the classification of each of said signals;
        feature extractors connected to said state machine for receiving said indicator and to said local participant signals for measuring and extracting at least one feature of each of said local participant signals classified as voice;
        a local speaker tracker connected to said feature extractors for selecting a number of said local participant signals for tracking based upon said extracted features;
        a first multiplexer connected to said speaker tracker, said local participant signals and said system communication bus, for passing said selected local participant signals and said extracted features to said system communication bus and for blocking the remaining local participant signals from said system communication bus;
        a demultiplexer connected to said system communication bus for receiving selected and passed participant signals from other remote nodes connected to said system bus and for receiving said extracted features of each of said selected and passed signals from said other remote conferencing nodes;
        a multi-core speaker tracker connected to said demultiplexer and to said local speaker tracker for comparing said extracted features of each of said significant signals of said local participant input signals and said remote participant input signals and providing a control signal to said first multiplexer to control the transmission of local significant signals to said system bus based upon said comparison; and
        a second multiplexer connected to said multi-core speaker tracker and to said first multiplexer to provide selected signals of said local and remote participants to said local participants.

2. The multiple core speaker tracking system of claim 1, wherein:
    said multiplexer communicates said features of each of said selected signals to said plurality of conferencing nodes.

3. The multiple core speaker tracking system according to claim 1, wherein:
    said local speaker tracker uses a high threshold to select signals and a low threshold to exclude signals from selection.

4. The multiple core speaker tracking system according to claim 1, wherein:
    said multi-core speaker tracker uses a high threshold to select signals and a low threshold to exclude signals from selection.

5. The multiple core speaker tracking system according to claim 1, wherein:
    said local speaker tracker selects said signals on the basis of the measured energy characteristics of said signal.

6. The multiple core speaker tracking system according to claim 1, wherein:
    said multi-core speaker tracker selects said signals on the basis of the measured energy level of said signal.

7. The multiple core speaker tracking system according to claim 1, wherein:
    said local speaker tracker considers the previous selected status of each speaker in determination of the current selection of speakers.

8. The multiple core speaker tracking system according to claim 1, wherein:
    said multi-core speaker tracker considers the previous selected status of each speaker in determination of the current selection of speakers.

9. The multiple core speaker tracking system of claim 1, wherein:
    said selection of local participant signals is based upon extracted parameters of said signals to select the strongest speaker signal while maintaining channel continuity of previously selected speaker signals.

10. A method for tracking speakers on a multi-core distributed conferencing system, comprising the steps of:
    setting a maximum number of active speakers for the system;
    receiving a plurality of extracted features corresponding to a plurality of signals from a plurality of cores on said system, wherein said features include:
        determining the voice or noise state of each speaker on said single core;
        assigning a valid identifier to each speaker signal on said single core which is identified as a voice signal;
        extracting values for the short-term energies, long term energies, and energy variation of each speaker signal identified as voice;
    detecting idle channels within said signals from said plurality of cores;
    comparing the number of assigned valid speakers to the allowed maximum number of active speakers and designating the valid speakers as current active speakers when the number of valid speakers does not exceed the allowed maximum number of active speakers;

updating the parameters and features for the current active speakers based upon the features extracted from the valid speakers when the identity of the current active speakers is the same as the identity of the previous active speakers.

11. The method for tracking speakers of claim 10, further comprising the steps of:

ordering the speakers according to the long term and short term energies of the current signals when there is a change in the identity of one or more of the speakers from the previous frame;

sequentially selecting the valid speakers beginning with the speaker having the highest energy as the current active speakers.

12. The method for tracking speakers of claim 10, further comprising the steps of:

reclassifying the previous active speakers as the current active speakers when the number of current valid speakers is less than one.

13. The method for tracking speakers of claim 10, further comprising the steps of:

ordering the speakers according to the long term and short term energies of the current signals when there are more valid speakers than the allowed maximum number of active speakers;

sequentially selecting the valid speakers beginning with the speaker having the highest energy as the current active speakers.

14. The method for tracking speakers of claim 13, further comprising:

lowering the threshold energy standard deviation when the number of valid speakers above the previous threshold energy standard deviation is less than the allowed maximum number of active speakers and re-comparing the assigned valid speakers to the revised lowered threshold.

15. A method of determining which speakers to mute and which speakers to pass through to other participants on a multi-core packet based speaker conferencing system, comprising the steps of:

setting a maximum number n of active speakers;

identifying the n most active speakers on each core, including:

determining the voice or noise state of each speaker on said single core;

assigning a valid identifier to each speaker signal on said single core which is identified as a voice signal;

extracting values for the short-term energies, long term energies, standard energy and energy variation of each speaker signal identified as voice;

providing the extracted values for the n most active speakers from each core to each of the other cores on the system;

comparing the extracted values for the n most active speakers of all cores to determine the n most active speakers for the entire system;

muting all of said speakers except for said n most active speakers for the entire system.

16. The method of claim 15, wherein said step of identifying the n most active speakers and said step of comparing the extracted values include:

detecting idle channels;

comparing the assigned valid speakers to the allowed maximum number of active speakers and comparing the energy of each valid speaker to a threshold energy standard deviation when the number of valid speakers exceeds the allowed maximum number of active speakers;

determining the number of speakers with energy above the noise threshold;

updating the parameters and features for the current active speakers based upon the features extracted from the valid speakers above the threshold, when number of valid speakers above the threshold is equal to the allowed maximum number of active speakers;

ordering the speakers according to the long term and short term energies of the current signals when there are more valid speakers above the threshold than the allowed maximum number of active speakers; and sequentially selecting the valid speakers beginning with the speaker having the highest energy as the current active speakers.

* * * * *